L. ANDERSON.
VEHICLE WHEEL.
APPLICATION FILED JAN. 26, 1914.
1,096,817.
Patented May 19, 1914.
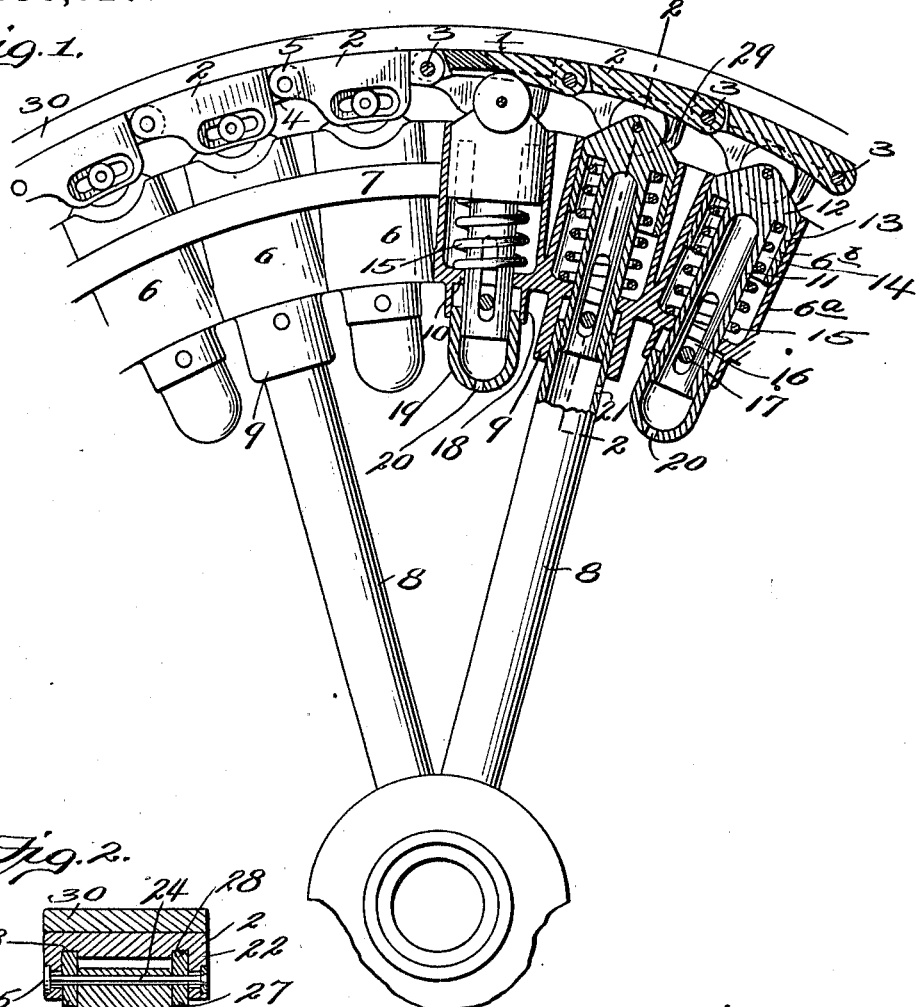
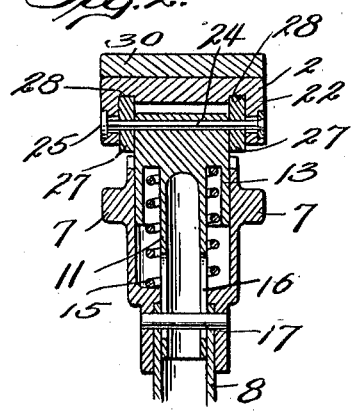
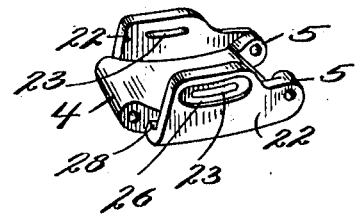
Inventor
Lycurgus Anderson

UNITED STATES PATENT OFFICE.

LYCURGUS ANDERSON, OF LAKE CREEK, TEXAS.

VEHICLE-WHEEL.

1,096,817.   Specification of Letters Patent.   Patented May 19, 1914.

Application filed January 26, 1914. Serial No. 814,464.

*To all whom it may concern:*

Be it known that I, LYCURGUS ANDERSON, a citizen of the United States, residing at Lake Creek, in the county of Delta and State of Texas, have invented new and useful Improvements in Vehicle-Wheels, of which the following is a specification.

This invention relates to improvements in vehicle wheels of that general type which embodies a flexible tread and radially arranged springs for absorbing shocks and cushioning the yielding action of the parts of said tread.

The invention proposes a construction which is essentially an improvement upon the construction shown in my prior Patent No. 1,058,518, of April 8, 1913.

The objects of the invention are to simplify the construction, to improve the operation, and to augment the strength and durability of a wheel of the general character above stated and disclosed in my said prior patent.

An embodiment of the invention is disclosed in the accompanying drawings, wherein—

Figure 1 is a fragmentary view of a wheel, partly in side elevation, and partly in longitudinal section, showing the features of the present invention; Fig. 2 is a detail cross sectional view on the line 2—2 of Fig. 1; and Fig. 3 is a detail perspective view of one of the tread blocks, the other tread blocks being similar in construction.

Similar characters of reference designate corresponding parts throughout the several views.

The improved wheel comprehends a flexible tread designated generally by the numeral 1, and made up of hingedly connected tread blocks 2. The blocks 2 are of similar construction, and the hinge connection between the same comprise transverse pins 3 and interfitting knuckles and ears 4 and 5 respectively, through which the pins 3 pass. Each tread block 2 is provided at one end with a knuckle 4 and at its opposite end with a pair of spaced ears 5, and the knuckle of one tread block fits between the ears of an adjoining tread block, the hinge joint being completed by the pin 3. As in the construction shown in my prior patent, the blocks 2 are individually yieldable and their yielding movements are suitably cushioned. The cushioning means comprises a plurality of radially disposed elements 6, similar to spokes, and which may conveniently be referred to as spokes, which elements are made in telescopically related sections. The telescoping sections of the spokes 6 are shown at $6^a$ and $6^b$, the sections $6^a$ being of cylindrical form and being fixed relatively to the hub of the wheel, and the sections $6^b$ being axially movable in and with relation to the sections $6^a$. The sections $6^a$ are preferably made as parts of a casting (or it might be a two-part stamping) which includes an annular reinforcing band 7 concentric to the hub and which is attached to the main spokes 8 of the wheel, the spokes 8 extending in the usual manner from the hub and having their outer ends fitted and secured in sockets 9 which are provided at the inner ends of the cylinders $6^a$, with which the spokes 8 aline. Each section $6^a$ has a base shoulder 10, and each radially movable section $6^b$ has a cylindrical shank 11 of substantially less diameter than the cylinder $6^a$, and which projects through an opening in the base of the cylinder, by virtue of which opening the shoulder 10 is provided. Each movable section $6^b$ includes an enlarged head 12 which is formed with an inwardly directed annular flange 13, concentrically surrounding the shank 11 and closely fitting the cylinder $6^a$. The shank 11 and the flange 13 define an annular recess 14, the base of which is opposed to the shoulder 10, and like said shoulder, provides a bearing for an expansive coil spring 15, one end of which bears against the shoulder 10, and the other end of which bears against the base of the recess 14. The shank 11 of each of member $6^b$ is provided near its inner end with a longitudinal slot 16, coincident with a diameter of said shank, and through which passes a transverse retaining pin 17. The retaining pin 17 has its ends secured in annular extensions provided at the inner ends of the cylinders $6^a$, these extensions, in the case of certain of said cylinders, consisting of the sockets 9 previously referred to, and in the cases of the remaining cylinders, consisting of annular flanges 18, somewhat similar to said sockets, but neither as deep nor as thick. To promote the appearance of the wheel, as well as to substantially exclude dust, the extensions 18 are provided with dome-like caps 19, which, at their apices, are formed with small apertures 20, which relieve pressure and vacuum during the radial movements of the shanks 11. The spokes 8 may be of any suitable construction, and may be hollow throughout their extent, or they may be solid, but with their outer ends cupped to receive and provide for radial movements of the shanks 11 of the adjoining spokes 6. The spokes 8 are provided with small apertures 21, which serve the same purpose as the apertures 20.

Each tread block 2 is pivotally connected to a section $6^b$ of the adjoining cushioning spoke or cushioning element 6. For this purpose the tread blocks are provided at their sides with inwardly extending flanges 22 which overlie the heads 12 of the sections $6^b$ and are provided with longitudinal arcuate slots 23. The heads 12 of the movable spoke sections $6^b$ are provided with transverse pins 24, which pins are closely fitted in said heads and have projecting end portions which extend through the slots 23 and are provided with terminal heads 25 which fit in countersunk recesses 26 concentric to said slots. In the embodiment shown the flanges 22 are spaced from the sides of the heads 12 and anti-friction rollers 27 are mounted on the pin 24, adjacent each side of the head 12, taking up the spaces between said head and the flanges 22. The tread block 2 is preferably formed on its inner face with longitudinal grooves or channels 28, in which the rollers 27 work. The spoke sections $6^b$ are pressed outwardly by the springs 15, and the outward movement of said spoke sections is resisted by the tread blocks. It follows that the rollers 27 always work against the inner face of the tread block. The slots 23 are of greater width than the diameter of the pin 24, and the diameter of the rollers 27 is selected to prevent said pin from normally contacting with the inner longitudinal wall of said slot. The head 12 of each spoke section $6^b$ is provided with oppositely beveled faces 29, disposed transversely of the wheel and meeting at a point in line with and slightly beyond the pin 24. These beveled faces 29 permit the tread blocks to yield in the plane of the wheel with reference to the pin 24 as an axis, and said tread blocks, in their yielding action, may have both slidable and pivotal components of movements, their slidable movement being due to the fact that the pins 24 are movable lengthwise of the slots 23, and their pivotal movement being due to the fact that the pins 24 provide a pivotal connection between the tread blocks 2 and the heads 12. Stated otherwise, the tread blocks 2 are pivotally movable with relation to the heads 12, and the axis of such pivotal movement varies in accordance with the relative position of the pin 24 in the slots 23.

The tread 1 may be provided with a flexible wear band or tire 30, and may, if desired, be incased in a flexible or resilient casing or tire (not shown). The said casing may be of suitable cross section, and the tread 1 and band 30, if the latter is used in connection with the casing, may have any suitable cross section which conforms to that of the casing in which said tread is inclosed. When the inclosing casing is used, its marginal portions will be suitably secured to the band 7.

The cushioning of the yielding movements of the tread blocks is due, for the most part, to the resistance of the springs 15, but in part, also, to a pneumatic cushion which is provided by the cylinder $6^a$ in combination with the flange 13, as is obvious. The relation which the tread blocks have to one another and to the movable elements $6^b$ is such that any shocks which are encountered by a particular tread block, while resisted, for the most part, by the cushioning element of such tread block, are also, in part, and substantially, resisted by the other tread blocks throughout the extent of the wheel. In other words, when a tread block encounters an obstacle and is pushed inwardly consequent to the shock developed, the tread of the wheel is deformed or buckled for a considerable extent on each side of the block which encounters the obstacle, and the movements of those blocks which participate in such deformation or buckling are, of course, resisted by the cushioning elements associated therewith. In this way the wheel has easy riding properties, and offers efficient resistance to shocks and stresses.

Reference has heretofore been made to the pins 24 as an axis for the movements of the tread blocks. While this statement is correct, it is nevertheless to be observed that the actual fulcrum for each tread block in its pivotal movement occurs on the peripheries of the rollers 27, at some point in the length of the tread block, or in the length of the grooves in which said rollers work. The best results, of course, are secured by employing a relatively large number of tread blocks. By actual experiment it has been found that highly satisfactory results are obtained in a construction wherein thirty-six tread blocks are employed.

Concerning the pins 17, it may be noted that these pins are not strictly necessary to the normal operation of the wheel, but they are of advantage in that they provide a positive connection between the sections of the cushioning elements and prevent any complete dissociation of said sections in case of injury or breakage of an adjoining tread block.

Having fully described my invention, I claim:

1. A vehicle wheel comprising a flexible tread made up of hingedly connected tread blocks, means for cushioning the individual yielding action of the tread blocks and for holding said blocks in normal relation, the means comprising spokes made in telescoping sections and springs acting on the outer sections of the spokes to move them outwardly, the said outer sections having heads at their outer ends and the tread blocks having at their sides inwardly-extending flanges which overlie said heads, a transverse pin extending through each head and through each of the flanges adjacent thereto, one of the companion elements through which the pin extends having a longitudinal slot formation and the pin extending through said slot formation and being fixed in the other companion element, and anti-friction roller means mounted on each pin to engage the inner face of the adjoining tread block, each of said heads and the anti-friction roller means associated therewith conjointly taking up the space between said flanges and the heads being formed to permit pivotal movements of the tread blocks.

2. A vehicle wheel comprising a flexible tread made up of hingedly connected tread blocks, means for cushioning the individual yielding action of the tread blocks and for holding said blocks in normal relation, the means comprising spokes made in telescoping sections and springs acting on the outer sections of the spokes to move them outwardly, the said outer sections having heads at their outer ends and the tread blocks having at their sides inwardly-extending flanges which overlie said heads and are provided with longitudinal slots, a transverse pin extending through each head and through each of the flanges adjacent thereto, the pin being fixed in the head and extending through the slots in said flanges and anti-friction roller means mounted on each pin to engage the inner face of the adjoining head block, each of said heads and the anti-friction roller means associated therewith conjointly taking up the space between said flanges and the heads being formed to permit pivotal movements of the tread blocks.

3. A vehicle wheel comprising a flexible tread made up of hingedly connected tread blocks, means for cushioning the individual yielding action of the tread blocks and for holding said blocks in normal relation, the means comprising spokes made in telescoping sections and springs acting on the outer sections of the spokes to move them outwardly, the said outer sections having heads at their outer ends and the tread blocks having at their sides inwardly extending flanges which overlie said heads and are provided with longitudinal slots, a transverse pin extending through each head and through each of the flanges adjacent thereto, the pin being fixed in the head and extending through the slots in said flanges, the head being of less width than the distance between said flanges, and anti-friction rollers mounted on said pin at each side of the head for engagement with the inner face of the tread block, the anti-friction rollers taking up the space between the heads and the flanges and the heads being formed to permit pivotal movements of the tread blocks.

4. A vehicle wheel comprising a flexible tread made up of hingedly connected tread blocks, means for cushioning the individual yielding action of the tread blocks and for holding said blocks in normal relation, the means comprising spokes made in telescoping sections and springs acting on the outer sections of the spokes to move them outwardly, the said outer spoke sections having heads and the tread blocks having flanges at the sides of said heads, transverse pins connecting said heads and said flanges and permitting of movement of the tread blocks in the plane of the wheel, and anti-friction rollers mounted on said pins and engaging the inner face of the tread blocks.

In testimony whereof I have hereunto set my hand in presence of two subscribing witnesses.

LYCURGUS ANDERSON.

Witnesses:
 D. O. ANDERSON,
 M. J. THOMAS.

Copies of this patent may be obtained for five cents each, by addressing the "Commissioner of Patents, Washington, D. C."